(12) United States Patent
Tabata et al.

(10) Patent No.: US 7,524,257 B2
(45) Date of Patent: Apr. 28, 2009

(54) PLANETARY GEAR TYPE MULTISTAGE TRANSMISSION FOR VEHICLE

(75) Inventors: Atsushi Tabata, Okazaki (JP); Terufumi Miyazaki, Toyota (JP)

(73) Assignee: Toyota Jidosha Kabuhsiki Kaisha, Toyota-shi (JP)

( * ) Notice: Subject to any disclaimer, the term of this patent is extended or adjusted under 35 U.S.C. 154(b) by 282 days.

(21) Appl. No.: 10/593,492

(22) PCT Filed: Mar. 23, 2005

(86) PCT No.: PCT/JP2005/006009
§ 371 (c)(1),
(2), (4) Date: Sep. 20, 2006

(87) PCT Pub. No.: WO2005/090827
PCT Pub. Date: Sep. 29, 2005

(65) Prior Publication Data
US 2007/0184932 A1 Aug. 9, 2007

(30) Foreign Application Priority Data
Mar. 24, 2004 (JP) ............................. 2004/087587

(51) Int. Cl.
*F16H 3/44* (2006.01)
(52) U.S. Cl. ...................... 475/285; 475/275; 475/284; 475/329; 475/330
(58) Field of Classification Search .................. 475/275, 475/284, 285, 311, 323, 329, 330
See application file for complete search history.

(56) References Cited

U.S. PATENT DOCUMENTS

| 5,525,117 A | * | 6/1996 | Morisawa et al. ........... 475/281 |
| 2003/0083174 A1 | | 5/2003 | Tabata et al. |

FOREIGN PATENT DOCUMENTS

| DE | 199 56 996 A 1 | 5/2000 |
| EP | 1 666 766 A1 | 6/2006 |
| JP | 2000 161450 | 6/2000 |
| JP | 2001 182785 | 7/2001 |
| JP | 2002 323098 | 11/2002 |
| JP | 2003 202057 | 7/2003 |

* cited by examiner

*Primary Examiner*—David D. Le
(74) *Attorney, Agent, or Firm*—Oblon, Spivak, McClelland, Maier & Neustadt, P.C.

(57) ABSTRACT

A small-sized vehicular planetary gear type step-variable transmission having seven or more forward drive gear positions with a wide range speed ratio and suitable for use on a vehicle. A transmission includes three planetary gear sets, four clutches, and two brakes to provide seven or more forward drive gear positions with a wide range speed ratio. A counter gear pair is constituted by an output gear disposed between a first transmission portion and a second transmission portion, and a driven gear which is mounted on a counter shaft rotatably about a second axis parallel to a first axis and which is held in meshing engagement with the output gear. A fourth clutch reduces an amount of increase of an axial length of the transmission, so that the transmission is small-sized and used on the vehicle.

20 Claims, 3 Drawing Sheets

| | C1 | C2 | C3 | C4 | B1 | B2 | F1 | SPEED RATIO | STEPPING RATIO |
|---|---|---|---|---|---|---|---|---|---|
| 1st | ○ | | | | | ◎ | ○ | 4.495 | |
| 2nd | ○ | | | | ○ | | | 2.697 | 1.667 |
| 3rd | ○ | | ○ | | | | | 1.864 | 1.447 |
| 4th | ○ | | | ○ | | | | 1.471 | 1.267 |
| 5th | ○ | ○ | | | | | | 1.238 | 1.188 |
| 6th | | ○ | | ○ | | | | 1.000 | 1.238 |
| 7th | | ○ | ○ | | | | | 0.823 | 1.215 |
| 8th | | ○ | | | ○ | | | 0.683 | 1.205 |
| R1 | | | ○ | | | ○ | | 4.022 | RANGE 6.578 |
| R2 | | | | ○ | | ○ | | 2.158 | |

○ ENGAGED  ◎ ENGAGED FOR ENGINE BRAKING

FIG. 4

PLANETARY GEAR TYPE MULTISTAGE TRANSMISSION FOR VEHICLE

TECHNICAL FIELD

The present invention relates to vehicular planetary gear type step-variable transmission disposed between an engine and a drive wheel of a vehicle such as an automobile.

BACKGROUND ART

For a vehicle, there is widely used a planetary gear type step-variable transmission which uses a plurality of planetary gear sets and coupling devices such as clutches and brakes for connecting elements of the planetary gear sets, for selectively establishing a plurality of predetermined speed ratios or gear positions. Patent Document 1 discloses an example of a step-variable transmission in the form of an automatic transmission for a front-engine front-drive vehicle (hereinafter referred to as "FF vehicle") or a rear-engine rear drive vehicle (hereinafter referred to as "RR vehicle"). This automatic transmission uses three planetary gear sets to provide six forward-drive gear positions.

[Patent Document 1] JP-2000-161450 A
[Patent Document 2] JP-2001-182785 A
[Patent Document 3] JP-2002-323098 A

DISCLOSURE OF THE INVENTION

A step-variable transmission used for the FF vehicle or RR vehicle is of a so-called transversely-mounted type, which is mounted on the vehicle such that the axis direction of the step-variable transmission is parallel to the width direction or the axles of the vehicle. Generally, the step-variable transmission of the transversely-mounted type has a comparatively larger restriction in its overall length, than a step-variable transmission of a longitudinally-mounted type overall length of which is not restricted by the width dimension of the vehicle. On the other hand, it is desired that the planetary gear type step-variable transmission as described above is simple in construction and small-sized, and has a large number of gear positions and a wide range of its speed ratio. It is further desired to increase the number of the gear positions of the step-variable transmission, for satisfying high levels of requirements such as smooth shifting characteristics, high fuel economy of the vehicle, and high drivability of the vehicle with a drive force suitable for a specific running condition of the vehicle.

However, Patent Document 1 does not propose techniques for realizing a step-variable transmission having seven or more forward drive gear positions, as a step-variable transmission which is used for the FF vehicle or RR vehicle and which is required to be more compact in construction than the longitudinally-mounted step-variable transmission.

The present invention was made in view of the background art described above, and it is therefore an object of this present invention to provide a small-sized vehicular planetary gear type step-variable transmission which can provide seven or more forward drive gear positions for obtaining a wide range of speed ratio, and which is transversely mounted on an FF vehicle or an RR vehicle.

Namely, the prevent invention according to claim 1 provides a vehicular planetary gear type step-variable transmission including a first transmission portion and a second transmission portion which are disposed coaxially with a first axis, and wherein a rotary motion of an input rotary member rotated by a drive power source about the first axis is transmitted to the second transmission portion through the first transmission portion, and a rotary motion of an output rotary member rotated about the first axis is transmitted to a drive wheel of a vehicle, characterized by comprising (a) a first shifting portion including a first planetary gear set of a double-pinion type having a first carrier connected to the input rotary member and the first intermediate output path, a first ring gear connected to a second intermediate output path a rotary motion of which is decelerated with respect to the rotary motion of the input rotary member at a speed ratio higher than that of the first intermediate output path, and a first sun gear fixed to a stationary member, (b) a second transmission portion including a second planetary gear set and a third planetary gear set each of which has a sun gear, a carrier and a ring gear, and having four rotary elements each of which is provided by one member or a combination of a plurality of connected members selected from among the sun gears, the carriers and the ring gears of the second and third planetary gear sets, the four rotary elements having respective rotating speeds that are represented along respective four straight lines in a collinear chart, which four straight lines are arranged in a direction from one of opposite ends of the collinear chart toward the other end, the first rotary element being selectively connected through a fourth clutch to the first intermediate output path, selectively connected through a third clutch to the second intermediate output path, and selectively fixed through a first brake to the stationary member, the second rotary member being selectively connected through a second clutch to the first intermediate output path, and selectively fixed through a second brake to the stationary member, the third rotary element being fixed to the output rotary member, and the fourth rotary member being selectively connected through a first clutch to the second intermediate output path, and (c) a power transmitting member which is disposed rotatably about a second axis parallel to the first axis and operatively connected to the output rotary member, for transmitting the rotary motion of the output rotary member to the drive wheel, the vehicular planetary gear type step-variable transmission being installed on the vehicle that the first axis and the second axis are parallel to a width direction of the vehicle.

The step-variable transmission of the present invention described above has seven or more forward drive gear positions having a wide range of speed ratio, in the presence of the first transmission portion having the two intermediate output paths having respective different speed ratios, the second transmission portion including the two planetary gear sets, and the four clutches and two brakes. Further, the power transmitting member is disposed rotatably about the second axis parallel to the first axis and is operatively connected to the output rotary member, for transmitting the rotary motion of the output rotary member to the drive wheel. Thus, the transmission is constructed with a relatively small size and is installed on an FF vehicle or RR vehicle such that the first axis and the second axis are parallel to the width direction of the vehicle.

According to a preferred form of the invention defined in claim 2, there is provided a vehicular planetary gear type step-variable transmission including a first transmission portion and a second transmission portion which are disposed coaxially with a first axis, and wherein a rotary motion of an input rotary member rotated by a drive power source about the first axis is transmitted to the second transmission portion through the first transmission portion, and a rotary motion of an output rotary member rotated about the first axis is transmitted to a drive wheel of a vehicle, characterized by comprising (a) a first transmission portion including a first planetary gear set of a double-pinion type having a first carrier connected to the input rotary member and the first intermediate output path, a first ring gear connected to a second intermediate output path a rotary motion of which is decelerated with respect to the rotary motion of the input rotary member at a speed ratio higher than that of the first intermediate output path, and a first sun gear fixed to a stationary member, (b) a second transmission portion including a second planetary gear set of a single-pinion type having a second sun gear, a second carrier and a third ring gear, and a third planetary gear set of a double-pinion type having a third sun gear, a third carrier and a third ring gear, the first sun gear being selectively connected through a fourth clutch to the first intermediate output path, selectively connected through a third clutch to the second intermediate output path, and selectively fixed through a first brake to the stationary member, the second carrier and the third carrier being constituted by a common member, selectively connected through a second clutch to the first intermediate output path, and selectively fixed through a second brake to the stationary member, the second ring gear and the third ring gear being constituted by a common member and fixed to the output rotary member, and the third sun gear being selectively connected through a first clutch to the second intermediate output path, and (c) a power transmitting member which is disposed rotatably about a second axis parallel to the first axis and operatively connected to the output rotary member, for transmitting the rotary motion of the output rotary member to the drive wheel, the vehicular planetary gear type step-variable transmission being installed on the vehicle such that the first axis and the second axis are parallel to a width direction of the vehicle.

The step-variable transmission according to the above-described preferred form of the present invention may have seven or more forward drive gear positions having a wide range of speed ratio, in the presence of the first transmission portion having the two intermediate output paths having respective different speed ratios, the second transmission portion including the two planetary gear sets, and the four clutches and two brakes. Further, the power transmitting member is disposed rotatably about the second axis parallel to the first axis, and is operatively connected to the output rotary member, for transmitting the rotary motion of the output rotary member to the drive wheel. Thus, the vehicular planetary gear type step-variable transmission can be constructed with a relatively small size and installed on an FF vehicle or an RR vehicle such that the first axis and the second axis are parallel to the width direction of the vehicle.

According to a preferred form of the invention defined in claim 3, the vehicular planetary gear type step-variable transmission has a plurality of gear positions selected from among (a) a first gear position which is established by engaging the first clutch and the second brake or a one-way clutch and which has a highest speed ratio, (b) a second gear position which is established by engaging the first clutch and the first brake and which has a speed ratio lower than that of the first gear position, (c) a third gear position which is established by engaging the first clutch and the third clutch and which has a speed ratio lower than that of the second gear position, (d) a fourth gear position which is established by engaging the first clutch and the fourth clutch and which has a speed ratio lower than that of the third gear position, (e) a fifth gear position which is established by engaging the first clutch and the second clutch and which has a speed ratio lower than that of the fourth gear position, (f) a sixth gear position which is established by engaging the second clutch and the fourth clutch and which has a speed ratio lower than that of the fifth gear position, (g) a seventh gear position which is established by engaging the second clutch and the third clutch and which has a speed ratio lower than that of the sixth gear position, and (h) an eighth gear position which is established by engaging the second clutch and the first brake and which has a speed ratio lower than that of the seventh gear position. The vehicular planetary gear type step-variable transmission according to this form of the invention may have seven or more forward drive gear positions, such as eight gear positions consisting of the first through eighth gear positions, or seven gear positions selected from the first through eighth gear positions.

According to a preferred form of the invention defined in claim 4, the first planetary gear set, the second planetary gear set and the third planetary gear set are disposed in this order of description, coaxially with the first axis, and the fourth clutch is disposed on one side of the first planetary gear set which is remote from the second planetary gear set, and is connected to said first carrier. The vehicular planetary gear type step-variable transmission according to this form of the invention, which may have seven or more forward drive gear positions, can be small-sized and suitably installed transversely on the FF vehicle or RR vehicle.

According to a preferred form of the invention defined in claim 5, comprising an oil pump which is disposed on one side of the first planetary gear set that is remote from the second planetary gear set and which is rotated by the drive power source to supply a working fluid for engaging the clutches and the brakes, and the fourth clutch is disposed in a space between the first planetary gear set and the oil pump. The vehicular planetary gear type step-variable transmission according to this form of the invention, which may have seven or more forward drive gear positions, can be small-sized and suitably installed transversely on the FF vehicle or RR vehicle.

According to a preferred form of the invention defined in claim 6, the stationary member to which the first sun gear of the first planetary gear set is fixed has a cylindrical shape and is disposed radially outwardly of the input rotary member, and the fourth clutch is disposed in a radially outer space within the stationary member. The vehicular planetary gear type step-variable transmission according to this form of the invention, which may have seven or more forward drive gear positions, can be small-sized and suitably installed transversely on the FF vehicle or RR vehicle.

According to a preferred form of the invention defined in claim 7, a fourth clutch piston for forcing friction members of the fourth clutch against each other to engage the fourth clutch is disposed on one side of the friction members which is remote from the first planetary gear set. In this form of the invention, the fourth clutch can be disposed adjacent to the first planetary gear set.

According to a preferred form of the invention defined in claim 8, the fourth clutch piston is disposed on one side of the friction members of the fourth clutch which is on the side of the oil pump. In this form of the invention, the fourth clutch can be disposed adjacent to the first planetary gear set.

According to a preferred form of the invention defined in claim 9, a centrifugal-pressure compensating oil chamber is provided for the fourth clutch piston. This centrifugal-pressure compensating oil chamber is formed in a space located radially inwardly of the friction members of the fourth clutch. In this form of the invention, the axial dimension of the step-variable transmission can be reduced.

According to a preferred form of the invention defined in claim 10, the third clutch has friction members disposed radially outwardly of the first ring gear, and a fourth cylinder of the fourth clutch is disposed in a space located radially inwardly of a third clutch piston provided for forcing the friction members of the third clutch against each other to engage the third clutch, an oil seal being provided between the third clutch piston and the fourth cylinder. In this form of the invention, the third clutch piston and the fourth cylinder disposed in the space located radially inwardly of the third clutch piston cooperate to define therebetween a centrifugal-pressure compensating oil chamber for the third clutch piston. In this arrangement, the axial dimension of the vehicular planetary gear type step-variable transmission can be reduced.

According to a preferred form of the invention defined in claim 11, an oil chamber for operating the third clutch piston is formed between a third clutch drum of the third clutch and the third clutch piston. In this form of the invention, the third clutch piston for forcing the friction members of the third clutch disposed radially outwardly of the first ring gear, to engage the third clutch, can be given a large diameter and an accordingly large surface area which receives a hydraulic pressure for operating the third clutch piston. This arrangement enables the vehicular planetary gear type step-variable transmission to be small-sized and suitably installed transversely on the FF vehicle or RR vehicle, without reducing a force acting on the third clutch piston, that is, without reducing a torque capacity of the third clutch.

According to a preferred form of the invention defined in claim 12, the output rotary member is disposed coaxially of the first axis, between the first transmission portion and the second transmission portion. The vehicular planetary gear type step-variable transmission according to this form of the invention is suitably installed transversely on the FF vehicle or RR vehicle.

According to a preferred form of the invention defined in claim 13, the second planetary gear set and the third planetary gear set constitute a planetary gear train of Ravigneaux type. In this form of the invention, the required number of parts constituting the second and third planetary gear sets can be reduced. In addition, the axial dimension of the vehicular planetary gear type step-variable transmission can be reduced.

According to a preferred form of the invention defined in claim 14, the third planetary gear set is of a double-pinion type. In this form of the invention, the Ravigneaux type planetary gear train is constituted by this third planetary gear set and the second planetary gear set.

NOMENCLATURE OF REFERENCE SIGNS

6: Engine (Drive power source)
10: Vehicular planetary gear type step-variable transmission
11: Transmission casing (Stationary member)
12: Input shaft (Input rotary member)
12*c*: First axis

14: First transmission portion
16: First planetary gear set
S1: First sun gear
R1: First ring gear
CA1: First carrier
16: Second transmission portion
17: Second planetary gear set
S2: Second sun gear
R2: Second ring gear
CA2: Second carrier
18: Third planetary gear set
S3: Third sun gear
R3: Third ring gear
CA3: Third carrier
19: Output gear (Output rotary member)
20*c*: Second axis
22: Driven gear (Power transmitting member)
36: Drive wheels
38: Oil pump
50: Third clutch drum
51: Third clutch piston
60: Fourth clutch cylinder (Fourth cylinder)
72: Oil seal
C1: First clutch
C2: Second clutch
C3: Third clutch
C4: Fourth clutch
B1: First brake
B2: Second brake
RE1: First rotary element
RE2: Second rotary element
RE3: Third rotary element
RE4: Fourth rotary element
M1: Transmitting member (First intermediate output path)
M2: Transmitting member (Second intermediate output path)

BEST MODE FOR CARRYING OUT THE INVENTION

Referring to the drawings, an embodiment of this invention will be described in detail.

Figure 1:
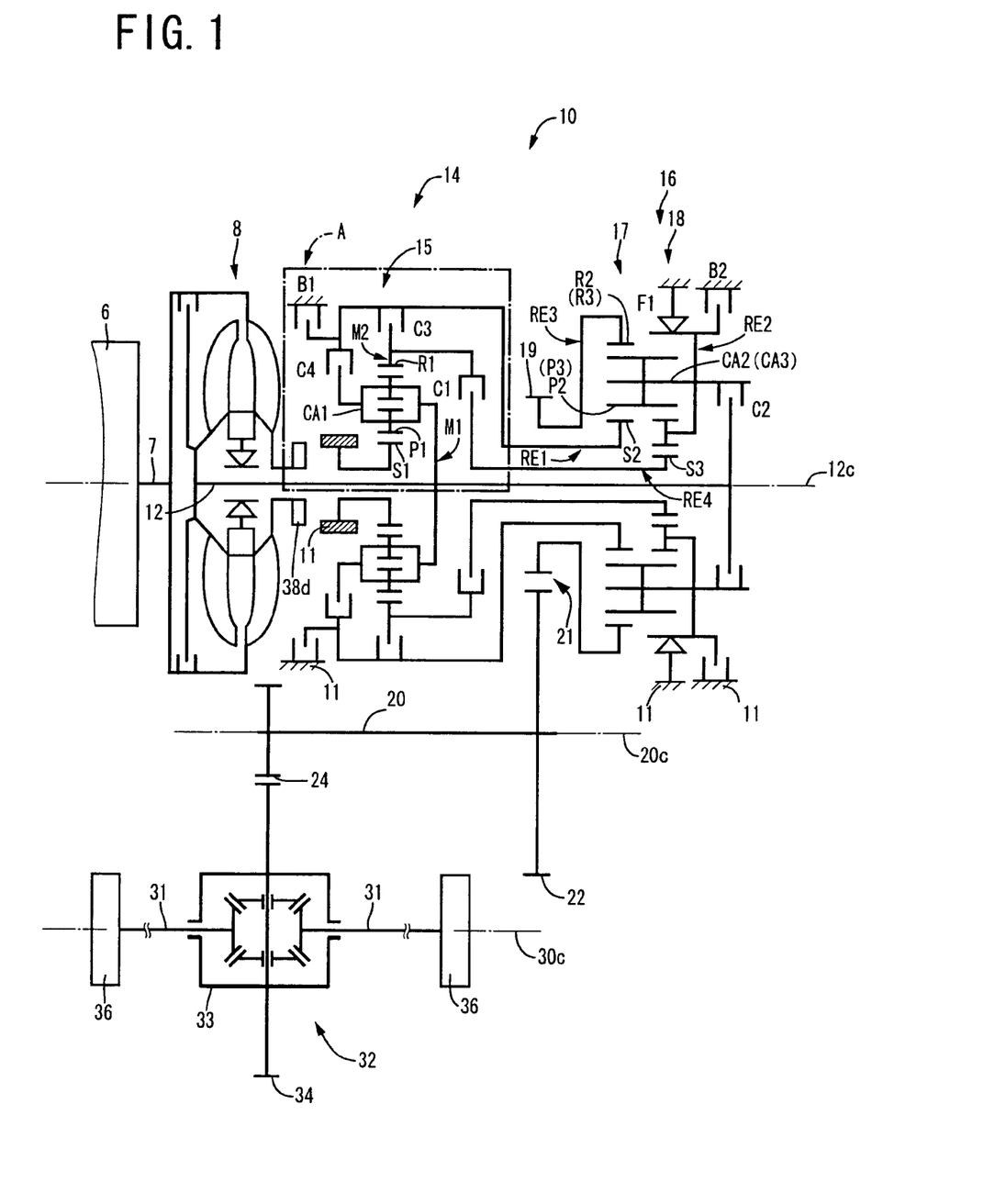
FIG. 1 is a schematic view for explaining major parts of a vehicular planetary gear type step-variable transmission according to one embodiment of the present invention.

FIG. 1 is the schematic view for explaining an arrangement of a vehicular planetary gear type step-variable transmission (hereinafter referred to as "transmission") 10 suitably used as a vehicular automatic transmission. As shown in FIG. 1, the transmission 10 has a stationary member in the form of a transmission casing (hereinafter referred to as "casing") 11 in which there are disposed three shafts which are rotatably supported by the casing 11 and disposed parallel to each other. The three shafts consist of an input rotary member in the form of an input shaft 12 having a first axis 12*c* of rotation; a counter shaft 20 having a second axis 20*c* of rotation; and a shaft having a third axis 30*c* of rotation parallel to right and left axles 31 and the first and second axes 12*c*, 20*c* of rotation. The transmission 10 is suitably used as a step-variable transmission of a so-called transversely mounted type mounted on an FF vehicle or an RR vehicle such that the above-indicated three axes are parallel to the width direction of the vehicle, that is, parallel to the axes 31.

Coaxially with the first axis 12*c*, there are disposed a torque converter 8 equipped with a lock-up clutch and connected to the input shaft 12, a first transmission portion 14 constituted primarily by a first planetary gear set 15, a second transmission portion 16 constituted primarily by a second planetary gear set 17 and a third planetary gear set 18, and an output rotary member in the form of an output gear 19 disposed between the first transmission portion 14 and the second transmission portion 16. On the counter shaft 20, there are disposed a power transmitting member in the form of a driven gear 22, and a differential drive pinion 24 such that the driven gear 22 and the differential drive pinion 24 are rotatable about the 4 second axis 20c. The driven gear 22 has a larger diameter than the output gear 19, meshes with the output gear 19 and cooperates with the output gear 19 to constitute a counter gear pair 21. The differential drive pinion 24 has a smaller diameter than the driven gear 22. Coaxially with the third axis 30c, a bevel gear type differential gear device 32 connected to the axles 31. The differential gear device 32 is provide with a differential ring gear 34 which meshes with the differential drive pinion 24 and has a larger diameter than the differential drive pinion 24 and which is fixed to a differential casing 33 and rotatable about the third axis 30c.

The transmission 10 constructed as described above is disposed between a vehicle drive power source in the form of an engine 6, and drive wheels 36. The engine 6 is an internal combustion engine such as a gasoline engine or a diesel engine. An output of the engine 6 is transmitted to the right and left drive wheels 36 through the transmission 10. Described in detail, the output of the engine 6 is transmitted to the input shaft 12 through the torque converter 8 connected to the crankshaft 7 of the engine 6, so that the input shaft 12 is rotated by the engine 6, about the first axis 12c, and a rotary motion of the input shaft 12 is transmitted through the first transmission portion 14 and the second transmission portion 16, to the output gear 19 which is rotatable about the first axis 12c. A rotary motion of the output gear 19 to be transmitted to the differential gear device 32 is decelerated by the driven gear 22, differential drive pinion 24 and differential ring gear 34 through which the rotary motion is transmitted to the differential gear device 32. Rotary motions of the differential gear device 32 is transmitted to the axles 32, and to the right and left drive wheels 36. Thus, the right and left drive wheels 36 are rotated by the engine 6.

The first transmission portion 14 is constituted by the first planetary gear set 15 of a double-pinion type. This first planetary gear set 15 has a first sun gear S1, a plurality of mutually meshing pairs of first planetary gears P1, and a first carrier CA1 supporting the first planetary gears P1 such that each first planetary gear P1 is rotatable about its axis, and such that each pair of first planetary gears P1 is rotatable about the axis of the first planetary gear set 15. The first planetary gear set 15 further has a first ring gear R1 meshing with the first sun gear S1 through the first planetary gears P1, and has a gear ratio $\rho_1$ of about 0.463, for example. The first carrier CA1 is connected to the input shaft 12 through a transmitting member M1 which constitutes a first intermediate output path. A rotary motion of the input shaft 12 is transmitted from the transmitting member M1 to the second transmission portion 16, at a speed ratio of 1.0. The first sun gear S1 is integrally fixed to the casing 11 such that the first sun gear S1 is not rotatable relative to the casing 11. The first ring gear R1 is connected to a transmitting member M2 which constitutes a second intermediate output path and a rotary motion of which is decelerated with respect to the rotary motion of the input shaft 12. Thus, an output of the first transmission portion 14 is transmitted to the second transmission portion 16 through the first intermediate output path, and the second intermediate output path which has a higher speed ratio than the first intermediate output path and which decelerates the rotary motion transmitted through the first intermediate output path. The speed ratio indicated above is the rotating speed of the input member divided by the rotating speed of the output member.

Namely, the first transmission portion 14 is arranged to transmit the rotary motion of the input shaft 12 functioning as an input rotary member, to the second transmission portion 16 through two output paths which have respective different speed ratios and which consist of the first intermediate output path provided by the transmitting member M1 and the second intermediate output path provided by the transmitting member M2. The first intermediate output path may substantially include members connected thereto, such as the first carrier CA1 and input shaft 12, in this embodiment, while the second intermediate output path may substantially include members connected thereto, such as the first ring gear R1, in this embodiment. The first and second intermediate paths function as intermediate output members or transmitting members.

The second transmission portion 16 is constituted by the second planetary gear set 17 of a single-pinion type, and the third planetary gear set 18 of a double-pinion type. The second planetary gear set 17 has a second sun gear S2, a second planetary gear P2, and a second carrier CA2 supporting the second planetary gear P2 such that the second planetary gear P2 is rotatable about its axis and about the axis of the second planetary gear set 17. The second planetary gear set 17 further has a second ring gear R2 meshing with the second sun gear S2 through the second planetary gear P2, and a gear ratio $\rho_2$ of about 0.463. for example. This third planetary gear set 18 has a third sun gear S3, a plurality of mutually meshing pairs of third planetary gears P3, and a third carrier CA3 supporting the third planetary gears P1 such that each third planetary gear P3 is rotatable about its axis, and such that each pair of third planetary gears P3 is rotatable about the axis of the third planetary gear set 18. The third planetary gear set 18 further has a third ring gear R3 meshing with the third sun gear S3 through the third planetary gears P3, and has a gear ratio $\rho_3$ of about 0.415, for example. The gear ratio $\rho_1$ is represented by $Z_{S1}/Z_{R1}$, and the gear ratio $\rho_2$ is represented by $Z_{S2}/Z_{R2}$, while the gear ratio $\rho_3$ is represented by $Z_{S3}/Z_{R3}$, where $Z_{S1}$, $Z_{R1}$, $Z_{S2}$, $Z_{R2}$, $Z_{S3}$ and $Z_{R3}$ respectively represent the number of teeth of the first sun gear S1, the number of teeth of the first ring gear R1, the number of teeth of the second sun gear S3, the number of teeth of the second ring gear R2, the number of teeth of the third sun gear S3, and the number of teeth of the third ring gear R3. The second carrier CA2 of the second planetary gear set 17 and the third carrier CA3 of the third planetary gear set 18 are formed integrally with each other, and the second ring gear R2 of the second planetary gear set 17 and the third ring gear R3 of the third planetary gear set 18 are formed integrally with each other. Further, the second planetary gear P1 functions one of the pair of mutually meshing third planetary gears P3. Thus, the second and third planetary gear sets 17, 18 cooperate to constitute a planetary gear train of Ravigneaux type.

The second sun gear S2 of the second transmission portion 16 is selectively connected through a fourth clutch C4 to the first carrier CA1 corresponding to the first intermediate output path, selectively connected through a third clutch C3 to the first ring gear R1 corresponding to the second intermediate output path, and selectively fixed through a first brake B1 to the casing 12. The second carrier CA2 and the third carrier CA3 which are formed integrally with each other are selectively connected through a second clutch C2 to the input shaft 12 corresponding to the first intermediate output path, and selectively fixed through a second brake B2 to the casing 12. The second ring gear R2 and the third ring gear R3 which are formed integrally with each other are fixed to the output gear 19, and the third sun gear S3 is selectively connected through a first clutch C1 to the first ring gear R1 corresponding to the second intermediate output path. A one-way clutch F1 is disposed in parallel with the second brake B2, and is automatically engaged only during a power-on run of the vehicle in which the drive wheels 36 are driven by a drive force of the engine 6, so that the second carrier CA2 and the third carrier CA2 are connected to the casing 12 through the one-way clutch F1 placed in the engaged state during the power-on run of the vehicle.

The first clutch C1, second clutch C2, third clutch C4, first brake B1 and second brake B2 are hydraulically operated frictional coupling devices widely used for conventional vehicular automatic transmissions. Each of these frictional coupling devices is wet-type multiple-disc clutch having a plurality of friction plates which are superposed on each other and which are forced against each other by a hydraulic actuator, or a band brake having one band or two bands which is/are wound on the outer circumferential surface of a rotary drum and tightened at one end by a hydraulic actuator. The frictional coupling device is arranged to selectively connect two members between which the frictional coupling device is interposed.

The transmission of the present embodiment is different from the automatic transmission disclosed in Patent Document 1 in that the first planetary gear set 15 is of the double-pinion type rather than the single-pinion type, and the fourth clutch C4 is provided, so that the present transmission have seven or more forward gear positions. The planetary gear sets and the hydraulically operated frictional coupling devices of the present transmission 10 provided with the additional fourth clutch C4 are suitably arranged and positioned relative to each other, to enable the transmission 10 to be used as a step-variable transmission for the FF vehicle or RR vehicle the width dimension of which restricts the axial dimension of the transmission 10. The arrangement of the present transmission 10, in particular, the positional arrangement of the fourth clutch C4 in relation to the associated members will be described.

Figure 2:
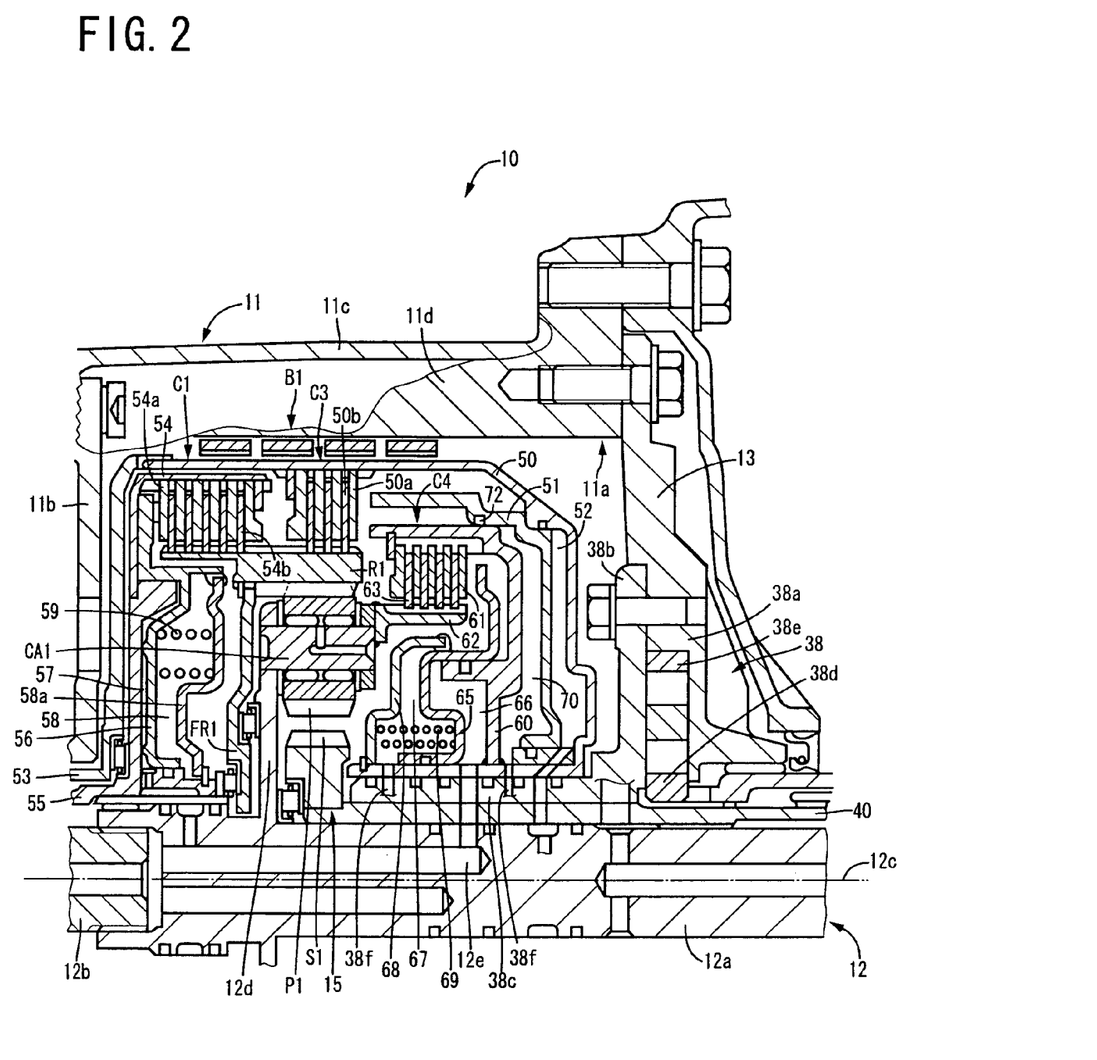
FIG. 2 is a fragmentary cross sectional view of a portion A of the transmission in the vicinity of a fourth clutch, which portion A is indicated by one-dot chain line in FIG. 1.

Referring to the fragmentary cross sectional view of FIG. 2, there is shown a portion A of the transmission 10 indicated by one-dot chain line in FIG. 1, in which the fourth clutch C4 and the members adjacent to the fourth clutch C4 are positioned. The members outside the portion A of FIG. 1, which are not shown in FIG. 2, include the torque converter 8, engine 6, etc. that are disposed on the right side of FIG. 2, and the output gear 19, second planetary gear set 176, third planetary gear set 18, second clutch C2 first brake, one-way clutch F1, etc. that are disposed on the left side of FIG. 2, in the state of connection with each other as shown in FIG. 1. That is, the first planetary gear set 15, second planetary gear set 17 and third planetary ear set 18 are arranged in this order of description, coaxially with the first axis 12c, and the output gear 19 is disposed in a space between the first planetary gear set 15 and the second planetary gear set 17, namely, in a space between the first transmission portion 14 and the second transmission portion 16. In the present embodiment, the right side and the left side as seen in FIG. 2 will be respectively referred to as front and rear sides.

As shown in FIG. 2, the casing 11 has an opening 11a in which the first clutch C1, third clutch C3 and first brake B1 are disposed radially outwardly of the first planetary gear set 15, while the fourth clutch C4 is disposed on the input shaft 12 (first axis 12c), on the front side of the first planetary gear set 15, that is, on one of opposite axial sides of the first planetary gear set 15 which is remote from the second planetary gear set 17. A casing cover 13 is disposed on an axial portion of the input shaft 12 (first axis 12c) which is on the side of the engine 6, that is, which is one of the opposite axial sides of the first planetary gear set 15 remote from the second planetary gear set 17, such that the casing cover 13 is fixed by screws to the casing 11, so as to close an open end of the opening 11a. That is, the fourth clutch C4 is disposed in a space between the first planetary gear set 15 and the casing cover 13, such that the fourth clutch C4 is located adjacent to the first planetary gear set 15. The casing 11 is provided on its rear side with a support wall 11b fixed thereto by screws, for supporting the output gear 19.

The casing 11 has a cylindrical wall portion 11c having an inner circumferential surface on which spline teeth 11d are formed. The input shaft 12 consists of a front portion 12a and a rear portion 12b which are spline-fitted to each other, and has an oil passage 12e for delivering a working oil to the clutches. The input shaft 12 further has, at a rear portion thereof, a flange 12d formed so as to extend from its outer circumferential surface. The working oil for engaging the clutches and brakes is supplied by an oil pump 38 including; a body 38a which is a radially central portion of the casing cover 13; a pump cover 38b fixed by screws to the body 38a; and an inner gear 38d and an outer gear 38e which are disposed in a pump chamber formed in the body 38a. The inner gear 38d is rotated by the engine 6, to deliver the working oil. The pump cover 38b is formed with a pump cover boss 38c extending toward the first planetary gear set 15.

In the first planetary gear set 15, the first sun gear S1 is splined to a rear end portion of a stationary member in the form of a sleeve shaft 40 fixedly fitted in the inner circumferential surface of the pump cover boss 38c, and the first carrier CA1 is fixed to the flange 12d. The first ring gear R1 is supported by a flange FR1 such that the first ring gear R1 is rotatable relative to the flange 12d and the front portion 12a, but is not movable along the first axis 12c relative to the flange 12d and the front portion 12a. The sheet shaft 40 indicated above has a cylindrical shape and is disposed radially outwardly of the input shaft 12 such that the input shaft 12 is rotatable about the first axis 12c.

In the third clutch C3, a third clutch drum 50 is connected to the second sun gear S2 through a transmitting member 53, and is supported at its radially inner end by the outer circumferential surface of the pump cover boss 38c such that the third clutch drum 50 is rotatable relative to the pump cover boss 38c. The third clutch drum 50 is provided with a plurality of annular friction members 50a splined to the inner circumferential surface of its cylindrical portion, such that the annular friction members 50a are disposed radially outwardly of the first ring gear R1. On the other hand, the first ring gear R1 is provided with a plurality of annular friction members 50b splined to its outer circumferential surface such that the annular friction members 50a and the annular friction members 50b are alternately arranged. Within the third clutch drum 50, a third clutch piston 51 is disposed such that the third clutch piston 51 is slidably moved within the third clutch drum 50, to force the friction members 50a and the friction members 50b against each other, for engaging the third clutch C3. Further, the third clutch drum 50 and the third clutch piston 51 cooperate to define therebetween an oil chamber 52 which is supplied with the working oil for forcing the third clutch piston 51.

In the first clutch C1, a first clutch drum 54 is disposed radially inwardly of the third clutch drum 50, and is supported rotatably by the transmitting member 53 and connected to a transmitting member 55 connected to the third sun gear S3. The first clutch drum 54 is provided with a plurality of annular friction members 54a splined to the inner circumferential surface of its cylindrical portion, such that the annular friction members 54a are disposed in a space on the rear side of the friction members 50*a*, 50*b* of the third clutch C3. As in the third clutch C3, the first ring gear R1 is provided with a plurality of annular friction members 54*b* splined to its outer circumferential surface such that the annular friction members 54*a* and the annular friction members 54*b* are alternately arranged. Within the first clutch drum 54, a first clutch piston 56 is disposed such that the first clutch piston 56 is slidably moved within the first clutch drum 54 and the transmitting member 55, to force the friction members 54*a* and the friction members 54*b* against each other, for engaging the first clutch C1. Further, the transmitting member 55 and the first clutch drum 54 cooperate to define therebetween an oil chamber 57 which is supplied with the working oil for forcing the first clutch piston 56, and the first clutch piston 56 cooperates with a return spring seat 58*a* to define therebetween an oil-tight centrifugal-pressure compensating oil chamber 58 for producing a thrust force acting in a direction opposite to a direction in which a thrust force produced by a centrifugal hydraulic pressure generated in the oil chamber 57 acts on the first clutch piston 56, so that the thrust force produced by the centrifugal hydraulic pressure is offset by the thrust force produced by the centrifugal-pressure compensating oil chamber 58. A return spring 59 is disposed within the centrifugal-pressure compensating oil chamber 58.

The first brake B1 is a band brake which is operated by a hydraulic actuator (now shown), to tighten the third clutch drum 50.

The fourth clutch C4 mounted on the input shaft 12 as described above is disposed radially outwardly of the sleeve shaft 40. The fourth clutch C4 has a fourth clutch cylinder 60 which is disposed radially inwardly of the third clutch piston 51 and welded at its radially inner end to the third clutch drum 50. The fourth clutch cylinder 50 is provided with a plurality of annular friction members 61 splined to the inner circumferential surface of its cylindrical portion. The fourth clutch C4 further has a fourth clutch hub 62 which is disposed radially inwardly of the cylindrical portion of the fourth clutch cylinder 60 and welded at its rear end to the first carrier CA1. The fourth clutch hub 62 is provided with a plurality of annular friction members 63 splined to the outer circumferential surface of its cylindrical portion such that the annular friction members 61 and the annular friction members 63 are alternately arranged. Within the fourth clutch cylinder 60, a fourth clutch piston 65 is disposed on one of opposite sides of the friction members 61, 63 which is remote from the first planetary gear set 15, such that the fourth clutch piston 65 is slidably movable within the fourth clutch cylinder 60, for forcing the friction members 61 and the friction members 63 against each other, to engage the fourth clutch C4. In other words, the fourth clutch piston 65 is disposed on one side of the friction members 61, 63 which is on the side of the casing cover 13 (oil pump 38). The fourth clutch cylinder 60 and the fourth clutch piston 65 cooperate with each other to define therebetween an oil chamber 66 radially inwardly of the fourth clutch hub 62 which is disposed radially inwardly of the friction members 61, 63. The oil chamber 66 is provided to force the fourth clutch piston 75. Further, the fourth clutch piston 65 cooperates with a return spring seat 68 to define therebetween an oil-tight centrifugal-pressure compensating oil chamber 67 for producing a thrust force acting in a direction opposite to a direction in which a thrust force produced by a centrifugal hydraulic pressure generated in the oil chamber 66 acts on the fourth clutch piston 65, so that the thrust force produced by the centrifugal hydraulic pressure is offset by the thrust force produced by the centrifugal-pressure compensating oil chamber 67. A return spring 69 is disposed within the centrifugal-pressure compensating oil chamber 67.

The centrifugal-pressure compensating oil chamber 67 is disposed radially inwardly of the fourth clutch hub 62, and overlaps the fourth clutch hub 62 in the direction of the first axis 12*c*.

In the fourth clutch C4 positioned as described above, an oil seal 72 is provided between the fourth clutch cylinder 60 and the third clutch piston 51, so that the fourth clutch cylinder 60 cooperates with the third clutch piston 51 to partially define therebetween an oil-tight centrifugal-pressure compensating oil chamber 70 for producing a thrust force acting in a direction opposite to a direction in which a thrust force produced by a centrifugal hydraulic pressure generated in the oil chamber 52 acts on the third clutch piston 51, so that the thrust force produced by the centrifugal hydraulic pressure is offset by the thrust force produced by the centrifugal-pressure compensating oil chamber 70.

The oil chambers such as the oil chamber 52 and the oil chamber 66 are supplied with the working oil through the oil passage 12*e* formed through the input shaft 12. The working oil is discharged from the centrifugal-pressure compensating oil chamber 70 through an oil passage 38*f* formed through the pump cover 38*b*, and the working oil is discharged from the centrifugal-pressure compensating oil chamber 67 through the oil passage 38*b* or an oil passage (not shown) formed through the return spring seat 68.

Figure 3:
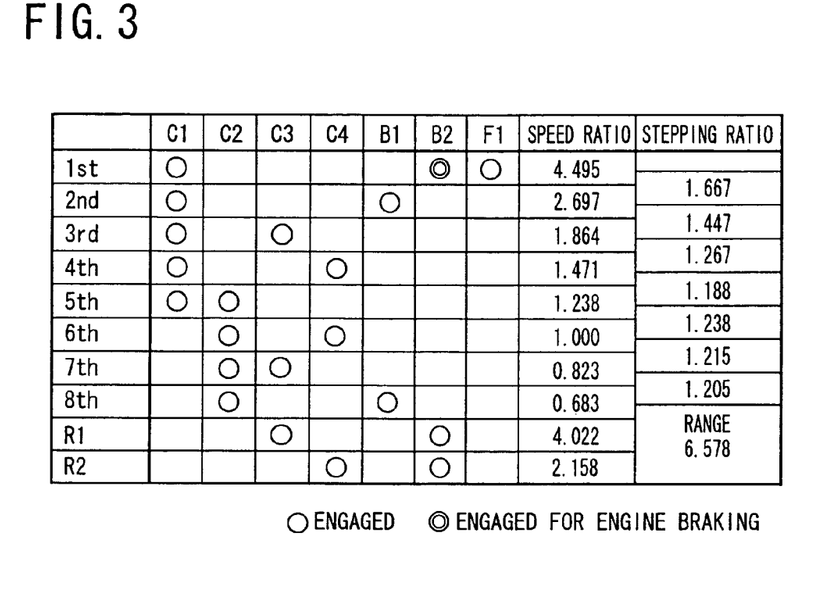
FIG. 3 is a view indicating a relationship between gear positions of the vehicular planetary gear type step-variable transmission of the embodiment of FIG. 1, and operating states of hydraulically operated frictional coupling devices for establishing the gear positions.

The transmission 10 constructed as described above is shifted to a selected one of a first gear position (first speed position) through an eighth gear position (eighth speed position), a first reverse drive gear position (first reverse drive speed position) and a second reverse drive gear position (second reverse drive speed position), by concurrent engaging actions of two devices selected from among the first clutch C1, second clutch C2, third clutch C3, fourth clutch C4, first brake B1 and second brake B2, as indicated in the table of engagement of FIG. 3. The above-indicated positions have respective speed ratios $\gamma$ (input shaft speed $N_{IN}$/Output gear speed $N_{OUT}$) which change as geometric series.

Described in detail, the first gear position having the highest speed ratio $\gamma_1$ of 4.495, for example, is established by engaging actions of the first clutch C1 and the second brake B2 to connect the third sun gear S3 and the first ring gear R1 to each other, and to fix the second carrier CA2 and the third carrier CA3 to the casing 12. When the first gear position is selected during the power-on run of the vehicle by the engine, the one-way clutch F1 is automatically engaged in place of the second brake B2. The second brake B2 is engaged to apply an engine brake to the vehicle during a coasting run of the vehicle in which a reverse drive force is transmitted from the drive wheels 36 back to the engine.

The second gear position having a speed ratio $\gamma_2$ lower than the speed ratio of the first gear position, for example, about 2.697, is established by engaging actions of the first clutch C1 and the first brake B1 to connect the third sun gear S3 and the first ring gear R1 to each other, and to fix the second sun gear S2 to the casing 11.

The third gear position having a speed ratio $\gamma_3$ lower than the speed ratio of the second gear position, for example, about 1.864, is established by engaging actions of the first clutch C1 and the third clutch C3 to connect the third sun gear S3 and the first ring gear R1 to each other, and to connect the second sun gear S2 and the first ring gear R1 to each other.

The fourth gear position having a speed ratio $\gamma_4$ lower than the speed ratio of the third gear position, for example, about 1.471, is established by engaging actions of the first clutch C1 and the fourth clutch C4 to connect the third sun gear S3 and the first ring gear R1 to each other, and to connect the second sun gear S2 and the first carrier CA1 to each other.

The fifth gear position having a speed ratio $\gamma_5$ lower than the speed ratio of the fourth gear position, for example, about 1.238, is established by engaging actions of the first clutch C1 and the second clutch C2 to connect the third sun gear S3 and the first ring gear R1 to each other, and to connect the second carrier CA2 and the third carrier CA3 to the input shaft 12.

The sixth gear position having a speed ratio $\gamma_6$ lower than the speed ratio of the fifth gear position, for example, about 1.000, is established by engaging actions of the second clutch C2 and the fourth clutch C4 to connect the second carrier CA2 and the third carrier CA3 to the input shaft 12, and to connect the second sun gear S2 and the first carrier CA1 to each other.

The seventh gear position having a speed ratio $\gamma_7$ lower than the speed ratio of the sixth gear position, for example, about 0.823, is established by engaging actions of the second clutch C2 and the third clutch C3 to connect the second carrier CA2 and the third carrier CA3 to the input shaft 12, and to connect the second sun gear S2 and the first ring gear R1 to each other.

The eighth gear position having a speed ratio $\gamma_8$ lower than the speed ratio of the seventh gear position, for example, about 0.683, is established by engaging actions of the second clutch C2 and the first brake B1 to connect the second carrier CA2 and the third carrier CA3 to the input shaft 12, and to fix the second sun gear S2 to the casing 11.

The first reverse drive gear position having a speed ratio $\gamma_{R1}$ between those of the first and second gear positions, for example, about 4.022, is established by engaging actions of the third clutch C3 and the second brake B2 to connect the second sun gear S2 and the first ring gear R1 to each other, and to connect the second carrier CA2 and the third carrier CA3 to each other.

The second reverse drive gear position having a speed ratio $\gamma_{R2}$ between those of the second and third gear positions, for example, about 2.158, is established by engaging actions of the fourth clutch C4 and the second brake B2 to connect the second sun gear S2 and the first carrier CA1 to each other, and to connect the second carrier CA2 and the third carrier CA3 to each other. The gear ratio $\rho_1$ of the first planetary gear set 15, the gear ratio $\rho_2$ of the second planetary gear set 17 and the gear ratio $\rho_3$ of the third planetary gear set 18 are determined such that the gear positions have the speed ratios indicated above.

In the transmission 10, a ratio ($=\gamma_1/\gamma_2$) of the speed ratio $\gamma_1$ of the first gear position to the speed ratio $\gamma_2$ of the second gear position is 1.667, and a ratio ($=\gamma_2/\gamma_3$) of the speed ratio $\gamma_1$ of the second gear position to the speed ratio $\gamma_3$ of the third gear position is 1.447. Further, a ratio ($=\gamma_3/\gamma_4$) of the speed ratio $\gamma_3$ of the third gear position to the speed ratio $\gamma_4$ of the fourth gear position is 1.267, and a ratio ($=\gamma_4/\gamma_5$) of the speed ratio $\gamma_4$ of the fourth gear position to the speed ratio $\gamma_5$ of the fifth gear position is 1.188. A ratio ($=\gamma_5/\gamma_6$) of the speed ratio $\gamma_5$ of the fifth gear position to the speed ratio $\gamma_6$ of the sixth gear position is 1.238, and a ratio ($=\gamma_6/\gamma_7$) of the speed ratio $\gamma_6$ of the sixth gear position to the speed ratio $\gamma_7$ of the seventh gear position is 1.215. A ratio ($=\gamma_7/\gamma_8$ of the speed ratio $\gamma_7$ of the seventh gear position to the speed ratio $\gamma_8$ of the eighth gear position is 1.205, Thus, the speed ratios of the first through eighth gear positions change as geometric series. The transmission 10 has a comparatively wide speed ratio range ($=\gamma_1/\gamma_8$) of 6.578, which is the ratio $\gamma_1$ of the first gear position to the speed ratio $\gamma_8$ of the eighth gear position.

Figure 4:
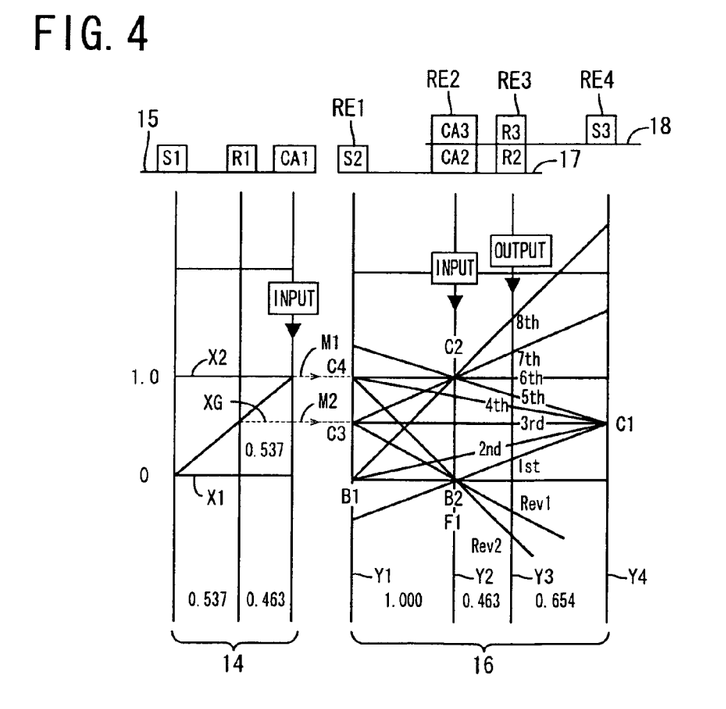
FIG. 4 is a collinear chart for explaining the operation of the vehicular planetary gear type step-variable transmission of the embodiment of FIG. 1.

The collinear chart of FIG. 4 indicates, by straight lines, the rotating speed of each element of the transmission 10 in each of the gear positions. The collinear chart of FIG. 4 is a two-dimensional coordinate system defined by a horizontal axis along which the gear ratios $\rho$ of the planetary gear sets 15, 17, 18 are taken, and a vertical axis along which the relative rotating speeds of the elements are taken. A lowest horizontal line X1 of three horizontal lines in the collinear chart indicates the speed "0", and a horizontal line X2 located above the horizontal line X1 indicates the speed "1.0", namely, the rotating speed of the first intermediate output path. A line XG between the horizontal line. X1 and the horizontal line X2 indicates the rotating speed $N_G$ of the second intermediate output path which is made lower than that of the first intermediate output path, according to the gear ratio $\rho_1$ of the first planetary gear set 15, that is, indicates the speed "0.537".

Vertical straight lines in the collinear chart respectively represent the first sun gear S1, first ring gear R1 and first carrier CA1 of the first transmission portion 14, as seen from the left side of the collinear chart. The distances between the adjacent ones of the three vertical lines are determined by the gear ratio $\rho_1$ of the first planetary gear set 15. Four vertical straight lines Y1 through Y4 in the collinear chart respectively represent a first rotary element Rein the form of the second sun gear S2, a second rotary element RE2 in the form of the second and third carriers CA2, CA3 fixed to each other, a third rotary element RE3 in the form of second and third ring gears R2, R3 fixed to each other, and a fourth rotary element in the form of the third sun gear S3, as seen from the left side of the collinear chart. The distances between the adjacent ones of those vertical lines Y1-Y4 are determined by the gear ratio $\rho_2$ of the second planetary gear set 17 and the gear ratio $\rho_3$ of the third planetary gear set 18. In the relationship among the vertical lines of the collinear chart, the distance between the sun gear and carrier corresponds to "1", while the distance between the carrier and ring gear corresponds to the gear ratio $\rho$ of the planetary gear set. In the first transmission portion 14 shown in FIG. 4, the distance between the vertical lines corresponding to the rotary elements in the form of the first sun gear S1 and the first carrier CA1 corresponds to "1". In the second transmission portion 16, the distance between the vertical lines Y1 and Y2 corresponds to "1", while the distances between the other vertical lines are determined on the basis of the above-indicated relationship among the vertical lines. As described above, the second transmission portion 16 has four rotary elements in the form of a first rotary element RE1, a second rotary element RE2, a third rotary element RE3 and a fourth rotary RE4, which are arranged in the collinear chart, in this order of description as seen in the direction from one end (left end) of the collinear chart toward the other end (right end) of the collinear chart. Each of these rotary elements is provided by one member or a combination of a plurality of connected members selected from among the second sun gear S2, second carrier CA2 and second ring gear R2 of the second planetary gear set 17, and the third sun gear S3, third carrier CA3 and third ring gear R3 of the third planetary gear set 18.

Referring to the collinear chart of FIG. 4, the first transmission portion 14 of the transmission 10 is arranged such that the first carrier SA1 which is one of the three rotary elements of the first planetary gear set 15 is fixed to the input shaft 12 through the transmitting member M1, and the first sun gear S1 which is another of the three rotary elements is fixed non-rotatably to the casing 11, while the first ring gear R2 which is the remaining one of the three rotary elements is fixed to the transmitting member M2, so that the rotary motion of the input shaft 12 is transmitted to the second transmission portion 16 through the first intermediate output path, and the second intermediate output path the rotary motion of which is decelerated with respect to the rotary motion of the first intermediate output path.

Further, the second transmission portion 16 is arranged such that the first rotary element RE1 (S2) is selectively connected through the fourth clutch C4 to the first carrier CA1 corresponding to the first intermediate output path, selectively connected through the third clutch C3 to the first ring gear R2 corresponding to the second intermediate output path, and selective fixed through the first brake B1 to the casing 11, while the second rotary element RE2 (CA2, CA2) is selectively connected through the second clutch C2 to the input shaft 12 corresponding to the first intermediate shaft and selectively fixed through the second brake B2 to the casing 11. Further, the third rotary element RE3 (R2, R3) is fixed to the output gear 19, while the fourth rotary element RE4 (S3) is selectively connected through the first clutch C1 to the first ring gear R1 corresponding to the second intermediate output path.

In the first gear position shown in the collinear chart of FIG. 4, the fourth rotary element RE4 is connected by an engaging action of the first clutch C1 to the transmitting member M2 corresponding to the second intermediate output path, and has a rotating speed of $N_C$, while the second rotary element RE2 is fixed by an engaging action of the second brake B2 to the casing 11, and has a rotating speed of 0. In this first gear position, the rotating speed of the output gear 19 is represented by a point of intersection ($1^{st}$) between the vertical line Y3, and a straight line which connects a point of intersection between the vertical line Y4 and the horizontal line XG and a point of intersection between the vertical line Y2 and the horizontal line X1.

In the second gear position, the fourth rotary element RE4 is connected by the engaging action of the first clutch C1 to the transmitting member M2, and has the rotating speed of $N_C$, while the first rotary element RE1 is fixed by an engaging action of the first brake B1 to the casing 11, and has the rotating speed of 0. In this second gear position, the rotating speed of the output gear 19 is represented by a point of intersection ($2^{nd}$) between the vertical line Y3, and a straight line which connects the point of intersection between the vertical line Y4 and the horizontal line XG and a point of intersection between the vertical line Y1 and the horizontal line X1.

In the third gear position, the fourth rotary element RE4 is connected by the engaging action of the first clutch C1 to the transmitting member M2, and has the rotating speed of $N_C$, while the first rotary element RE1 is connected through an engaging action of the third clutch C3 to the transmitting member M2, and has the rotating speed of $N_C$. In this third gear position, the rotating speed of the output gear 19 is represented by a point of intersection ($3^{rd}$) between the vertical line Y3, and a straight line which connects the point of intersection between the vertical line Y4 and the horizontal line XG and a point of intersection between the vertical line Y1 and the horizontal line XG.

In the fourth gear position, the four rotary element RE4 is connected by the engaging action of the first clutch C1 to the transmitting member M2, and has the rotating speed of $N_C$, while the first rotary element RE1 is connected by an engaging action of the fourth clutch C3 to the transmitting member M1 corresponding to the first intermediate output path, and a rotating speed of 1.0. In this fourth gear position, the rotating speed of the output gear 19 is represented by a point of intersection ($4^{th}$) between the vertical line Y3, and a straight line which connects the point of intersection between the vertical line Y4 and the horizontal line XG and a point of intersection between the vertical line Y1 and the horizontal line X2.

In the fifth gear position, the fourth rotary element RE4 is connected by the engaging action of the first clutch C1 to the transmitting member M2, and has the rotating speed of $N_C$, while the second rotary element RE2 is connected by an engaging action of the second clutch C2 to transmitting member M2, and has the rotating speed of 1.0. In this fifth gear position, the rotating speed of the output gear 19 is represented by a point of intersection ($5^{th}$) between the vertical line Y3, and a straight line which connects the point of intersection between the vertical line Y4 and the horizontal line XG and a point of intersection between the vertical line Y2 and the horizontal line X2.

In the sixth gear position, the second rotary element RE2 is connected by an engaging action of the second clutch C2 to the transmitting member M1, and has the rotating speed of 1.0, while the first rotary element RE1 is connected by an engaging action of the fourth clutch C4 to the transmitting member M1, and has the rotating speed of 1.0. In this sixth gear position, the rotating speed of the output gear 19 is represented by a point of intersection ($6^{th}$) between the vertical line Y3, and a straight line which connects the point of intersection between the vertical line Y2 and the horizontal line X2 and the point of intersection between the vertical line Y1 and the horizontal line X2.

In the seventh gear position, the second rotary element RE2 is connected by the engaging action of the second clutch C2, and has the rotating speed of 1.0, while the first rotary element RE1 is connected by the engaging action of the third clutch C3, and has the rotating speed of $N_C$. In this seventh gear position, the rotating speed of the output gear 19 is represented by a point of intersection ($7^{th}$) between the vertical line Y3, and the straight line which connects the point of intersection between the vertical line Y2 and the horizontal line X2 and the point of intersection between the vertical line Y1 and the horizontal line XG.

In the eighth gear position, the second rotary element RE2 is connected by the engaging action of the second clutch C2, and has the rotating speed of 1.0, while the first rotary element RE1 is fixed by the engaging action of the first brake B1 to the casing, and has the rotating speed of 0. In this eighth gear position, the rotating speed of the output gear 19 is represented by a point of intersection ($8^{th}$) between the vertical line Y3, and a straight line which connects the point of intersection between the vertical line Y2 and the horizontal line X2, and the point of intersection between the vertical line Y1 and the horizontal line X1.

In the first reverse drive gear position, the first rotary element RE1 is connected by the engaging action of the third clutch C3 to the transmitting member M3, and has the rotating speed of $N_C$, while the second rotary element RE2 is fixed by the engaging action of the second brake B2 to the casing 11, and has the rotating speed of 0. In this first reverse drive gear position, the negative rotating speed of the output gear 19 is represented by a point of intersection (Rev1) between the vertical line Y3, and a straight line which connects the point of intersection between the vertical line Y1 and the horizontal line XG and the point of intersection between the vertical line Y2 and the horizontal line X1.

In the second reverse drive gear position, the first rotary element RE1 is connected by the engaging action of the fourth clutch C4 to the transmitting member M1, and has the rotating speed of 1.0, while the second rotary element RE1 is fixed by the engaging action of the second brake B2 to the casing 11, and has the rotating speed of 0. In this second reverse drive gear position, the negative rotating speed of the output gear 19 is represented by a point of intersection (Rev2) between the vertical line Y3, and a straight line which connects the point of intersection between the vertical line Y1 and the horizontal line X2 and the point of intersection between the vertical line Y2 and the horizontal line X1.

As described above, the transmission 10 of the present embodiment has the eight forward drive gear positions having the comparatively wide speed ratio range of 6.578, in the presence of the three planetary gear sets in the form of the first planetary gear set 15, second planetary gear set 17 and third planetary gear set 18, and the three clutches C and two brakes B. Further, the counter gear pair 21 is constituted by the output gear 19 disposed in a space between the first transmission portion 14 and the second transmission portion 16, and the driven gear 22 which is mounted on the counter shaft 20 rotatably about the second axis 20c parallel to the first axis 12c and which is held in meshing engagement with the output gear 19. Thus, the transmission 10 is constructed with a relatively small size and is installed on the FF vehicle or RR vehicle such that the first axis 12c and the second axis 20c are parallel to the width direction of the vehicle.

In the present embodiment, the bevel gear type differential gear device 32 is disposed coaxially with the third axis 30c, such that the rotary motion of the counter shaft 20 is transmitted to the differential gear device 32 through the differential drive pinion 24 having a small diameter than the driven gear 22 and mounted on the counter shaft 20, and the differential ring gear 34 meshing with the differential drive pinion 24. The rotary motion of the engine 6 is transmitted to the drive wheels 36 through a plurality of speed reducing devices including the counter gear pair 21, differential drive pinion and the differential ring gear 34. Accordingly, the required capacity of the transmission 10 with respect to the engine output is reduced, and the transmission 10 can be easily made compact.

Further, the transmission 10 according to the present embodiment is provided with the fourth clutch C4 to provide the eight forward drive gear positions. This fourth clutch C4 is disposed on one side of the first planetary gear set 15 which is remote from the second planetary gear set 17, that is, disposed in a space between the first planetary gear set 15 and the casing cover 13 (oil pump 38) such that the fourth clutch C4 is located adjacent to the first planetary gear set 15 and connected to the first carrier CA1. Further, the return spring seat 68 is disposed in a space located radially inwardly of the friction members 61 and friction members 63 of the fourth clutch C4, and the fourth clutch piston 65 is disposed on one side of the return spring seat 68 and the friction members 61, 63, which one side is remote from the first planetary gear set 15. The return spring seat 68 and the fourth clutch piston 65 cooperate with each other to define therebetween the centrifugal-pressure compensating oil chamber 67, such that the centrifugal-pressure compensating oil chamber 67 is formed radially inwardly of the fourth clutch hub 62, and overlaps the fourth clutch hub 62 in the direction of the first axis 12c. Unlike an arrangement in which the centrifugal-pressure compensating oil chamber 67 was spaced from the fourth clutch hub 62 in the direction of the first axis 12c, the present arrangement is effective to reduce the amount of increase of the axial dimensions of the transmission 10, in particular, the dimension in the direction of the first axis 12c, and reduce the size of the transmission 10, permitting the transmission 10 to be installed on the FF vehicle or RR vehicle. Further, the fourth clutch piston 65 disposed on one side of the friction members 61, 63 which is remote from the first planetary gear set 15 permits the fourth clutch C4 to be disposed adjacent to the first planetary gear set 15. In addition, the diameter of the fourth clutch cylinder 60 is made smaller than that of the third clutch piston 51.

The present embodiment is further arranged such that the fourth clutch cylinder 60 is disposed in a space radially located inwardly of the cylindrical portion of the third clutch piston 51, and such that the oil seal 72 is provided between the fourth clutch cylinder 60 and the third clutch piston 51, so that the fourth clutch cylinder 60 and the third clutch piston 51 cooperate to partially define the centrifugal-pressure compensating oil chamber 70. Unlike an arrangement in which the centrifugal-pressure compensating oil chamber 70 was defined independently of the fourth clutch cylinder 60, the present arrangement is effective to reduce the amount of increase of the axial dimensions of the transmission 10, in particular, the dimension in the direction of the first axis 12c, and reduce the size of the transmission 10, permitting the transmission 10 be installed on the VV vehicle or RR vehicle.

The present embodiment is further arranged such that the third clutch drum 50 and the third clutch piston 51 of the third clutch C3 cooperate to define the oil chamber 52 for operating the third clutch piston 51. The third clutch piston 51 has a sufficiently large surface area which receives a pressing force or a hydraulic pressure that enables the third clutch C3 to provide a torque capacity. That is, the third clutch C3 which receives the decelerated rotary motion of the input shaft 12 is required to provide a larger torque capacity than the second clutch C2 and the fourth clutch C4, which larger torque capacity is provided by a comparatively large pressure-receiving surface area of the third clutch piston 51.

The required torque capacity of the third clutch C3 which is almost equal to that of the first clutch C1 that also receives the decelerated rotary motion of the input shaft 12 is provided by the sufficiently large pressure-receiving surface area of the third clutch piston 51, so that the step-variable transmission 10 having the eight forward drive gear positions can be provided with the fourth clutch C4, while assuring a good balance of the torque capacity between the first clutch C1 and the third clutch C3.

The present embodiment is further arranged such that the first reverse drive gear position is established by the engaging actions of the third clutch C3 and the second brake B2, while the second reverse drive gear position is established by the engaging actions of the fourth clutch C4 and the second brake B2, so that the transmission has the two reverse drive gear positions as well as the eight forward drive gear positions.

The present embodiment is further arranged such that the second planetary gear set 17 of the single-pinion type and the third planetary gear set 18 of the double-pinion type constitute the planetary gear train of Ravigneaux type, so that the axial dimensions of the transmission 10, in particular, the dimension in the direction of the first axis 12c can be reduced.

While the embodiment of this invention has been described in detail by reference to the drawings, it is to be understood that the present embodiment may be otherwise embodied.

Although the step-variable transmission 10 of the embodiment described above has the eight forward drive gear positions, the present invention is applicable to a transmission having a plurality of gear positions selected from the first through eighth gear positions. For example, the present invention is applicable to a step-variable transmission having seven gear positions which are all but one of the first through eighth gear positions, for example, the first through seventh gear positions, or the second through eighth gear positions.

Further, the counter gear pair 21 provided in the illustrated embodiment may be replaced by an output rotary member in the form of a sprocket wheel disposed coaxially with the first axis 12c, a power transmitting member in the form of a sprocket wheel disposed coaxially with the second axis 20c, and a chain operatively connecting those sprocket wheels, so that the rotary motion of the output gear 19 is transmitted to the right and left drive wheels 36 through the sprocket wheels and the chain. Further, the counter gear pair 21 may be replaced by pulleys and a belt, rather than those sprocket wheels and chain. Further, the output rotary member in the form of a sprocket wheel may be operatively connected to the differential gear device 32 through another sprocket wheel in place of the differential ring gear 34, and a chain connecting those two sprocket wheels, so that the rotary motion of the output rotary member is transmitted to the drive wheels 36 through the above-indicated another sprocket wheel and the chain.

In the illustrated embodiment, the output gear 19 is provided between the first transmission portion 14 and the second transmission portion 16. However, the output gear 19 need not be disposed between the first and second transmission portions 14, 16. For instance, the output gear 19 may be disposed on one side of the second transmission portion 16 which is remote from the first transmission portion 14.

While the engine 6 and the torque converter 8 are connected to each other through the crankshaft 7 in the transmission 10 of the illustrated embodiment, the engine 6 and the torque converter 8 may be operatively connected to each other through gears or a belt, and need not be disposed coaxially with each other. Further, the engine 6 may be replaced by any other drive power source such as an electric motor.

The second planetary gear P2 in the transmission 10 may have two axial portions which respectively correspond to the second and third planetary gear sets 17, 18 and which have respective different diameters (different numbers of teeth). Although the second and third planetary gear sets 17, 18 constitute the planetary gear train of Ravigneaux type, the second ring gear R2 and the third ring gear R3 need not be provided by a common member.

In the transmission 10 of the illustrated embodiment, the one-way clutch F1 is provided in parallel with the second brake B2. However, the one-way clutch F1 need not be provided. In the absence of the one-way clutch F1, the first gear position is established by the engaging actions of the first clutch C1 and the second brake B2, during the power-on running of the vehicle, as well as during the coasting run of the vehicle. Further, one-way clutch may be disposed in series or in parallel with any of the first clutch C1 through the fourth clutch C4, and the first and second brakes B1 and B2, so as to facilitate the shifting control. Further, any of the first through fourth clutches C1-C4 and the first and second brakes B1, B2 may be replaced by a one-way clutch. In this case, too, the transmission can be shifted.

Although a fluid-operated power transmitting device in the form of the torque converter 8 disposed between the engine 6 and the input shaft 12 is provided with the lock-up clutch, the lock-up clutch need not be provided. Further, the torque converter 8 may be replaced by a fluid coupling, a powder-type electromagnetic clutch, or a multiple-disc or single-disc hydraulic clutch.

In the collinear chart of the illustrated embodiment, the vertical lines Y1 through Y4 are arranged in this order of description as seen in the direction from the left side toward the right side, the vertical lines Y1-Y4 may be arranged in this order of description as seen in the direction from the right side toward the left side. While the horizontal line X2 corresponding to the rotating speed of 1 is located above the horizontal line X1 corresponding to the rotating speed of 0, the horizontal line X2 may be located below the horizontal line X1.

It is to be understood that one embodiment of this invention has been described for illustrative purpose only, and that the present invention may be embodied with various other changes and improvement which may occur to those skilled in the art.

The invention claimed is:

1. A vehicular planetary gear type step-variable transmission comprising:

a first transmission portion and a second transmission portion which are disposed coaxially with a first axis, and wherein a rotary motion of an input rotary member rotated by a drive power source about the first axis is transmitted from said first transmission portion to said second transmission portion through a first intermediate output path, and a second intermediate output path a rotation motion of which is decelerated with respect to the rotary motion of said input rotary member at a speed ratio higher than that of said first intermediate output path, and a rotary motion of an output rotary member rotated about said first axis is transmitted to a drive wheel of a vehicle;

said first transmission portion including a first planetary gear set of a double-pinion type having a first carrier connected to said input rotary member and said first intermediate output path, a first ring gear connected to said second intermediate output path, and a first sun gear fixed to a stationary member;

said second transmission portion including a second planetary gear set of a single-pinion type having a second sun gear, a second carrier and a second ring gear, and a third planetary gear set of a double-pinion type having a third sun gear, a third carrier and a third ring gear, said second sun gear being selectively connected through a fourth clutch to said first intermediate output path, selectively connected through a third clutch to said second intermediate output path, and selectively fixed through a first brake to said stationary member, said second carrier and said third carrier being constituted by a common member, selectively connected through a second clutch to said first intermediate output path, and selectively fixed through a second brake to said stationary member, said second ring gear and said third ring gear being constituted by a common member and fixed to said output rotary member, and said third sun gear being selectively connected through a first clutch to said second intermediate output path; and a power transmitting member is disposed rotatably about a second axis parallel to said first axis and operatively connected to said output rotary member, for transmitting the rotary motion of said output rotary member to said drive wheel, said vehicular planetary gear type step-variable transmission being installed on the vehicle such that said first axis and said second axis are parallel to a width direction of the vehicle.

2. The vehicular planetary gear type step-variable transmission according to claim 1, wherein said output rotary member is disposed coaxially of said first axis, between said first transmission portion and said second transmission portion.

3. The vehicular planetary gear type step-variable transmission according to claim 1, wherein said second planetary gear set and said third planetary gear set constitute a planetary gear train of Ravigneaux type.

4. The vehicular planetary gear type step-variable transmission according to claim 1, which has a plurality of gear positions selected from among:

a first gear position which is established by engaging said first clutch and said second brake or a one-way clutch and which has a highest speed ratio;

a second gear position which is established by engaging said first clutch and said first brake and which has a speed ratio lower than that of said first gear position;

a third gear position which is established by engaging said first clutch and said third clutch and which has a speed ratio lower than that of said second gear position;

a fourth gear position which is established by engaging said first clutch and said fourth clutch and which has a speed ratio lower than that of said third gear position;

a fifth gear position which is established by engaging said first clutch and said second clutch and which has a speed ratio lower than that of said fourth gear position;

a sixth gear position which is established by engaging said second clutch and said fourth clutch and which has a speed ratio lower than that of said fifth gear position;

a seventh gear position which is established by engaging said second clutch and said third clutch and which has a speed ratio lower than that of said sixth gear position; and an eighth gear position which is established by engaging said second clutch and said first brake and which has a speed ratio lower than that of said seventh gear position.

5. The vehicular planetary gear type step-variable transmission according to claim 4, wherein said fourth clutch includes friction members, and a fourth clutch piston for forcing said friction members against each other to engage said fourth clutch, said fourth clutch piston is disposed on one side of said friction members which is remote from said first planetary gear set.

6. The vehicular planetary gear type step-variable transmission according to claim 5, wherein said fourth clutch piston which partially defines an oil chamber for pressing said fourth clutch piston, said oil chamber being located radially inwardly of the friction members of said fourth clutch.

7. A vehicular planetary gear type step-variable transmission comprising:

a first transmission portion and a second transmission portion which are disposed coaxially with a first axis, and wherein a rotary motion of an input rotary member rotated by a drive power source about the first axis is transmitted from said first transmission portion to said second transmission portion through a first intermediate output path, and a second intermediate output path a rotation motion of which is decelerated with respect to the rotary motion of said input rotary member at a speed ratio higher than that of said first intermediate output path, and a rotary motion of an output rotary member rotated about said first axis is transmitted to a drive wheel of a vehicle;

said first transmission portion including a first planetary gear set of a double-pinion type having a first carrier connected to said input rotary member and said first intermediate output path, a first ring gear connected to said second intermediate output path, and a first sun gear fixed to a stationary member;

said second transmission portion including a second planetary gear set and a third planetary gear set each of which has a sun gear, a carrier and a ring gear, and having a first rotary element, a second rotary element, a third rotary element, and a fourth rotary element, each of said first, second, third, and fourth rotary elements being provided by one member or a combination of a plurality of connected members selected from among said sun gears, said carriers and said ring gears of said second and third planetary gear sets, said first rotary element being selectively connected through a fourth clutch to said first intermediate output path selectively connected through a third clutch to said second intermediate output path, and selectively fixed through a first brake to said stationary member, said second rotary member being selectively connected through a second clutch to said first intermediate output path, and selectively fixed through a second brake to said stationary member, said third rotary element being fixed to said output rotary member, and said fourth rotary member being selectively connected through a first clutch to said second intermediate output path;

a power transmitting member is disposed rotatably about a second axis parallel to said first axis and operatively connected to said output rotary member, for transmitting the rotary motion of said output rotary member to said drive wheel;

said vehicular planetary gear type step-variable transmission being installed on the vehicle such that said first axis and said second axis are parallel to a width direction of the vehicle;

said first planetary gear set, said second planetary gear set and said third planetary gear set being disposed in this order of description, coaxially with said first axis; and said fourth clutch being disposed on one side of said first planetary gear set which is remote from said second planetary gear set, and being connected to said first carrier.

8. The vehicular planetary gear type step-variable transmission according to claim 7, wherein said stationary member to which said first sun gear of said first planetary gear set is fixed has a cylindrical wall portion and is disposed coaxially with said input rotary member, and wherein said fourth clutch is disposed in a radially outer space within said cylindrical wall portion of said stationary member.

9. The vehicular planetary gear type step-variable transmission according to claim 7, wherein said output rotary member is disposed coaxially with said first axis, between said first transmission portion and said second transmission portion.

10. The vehicular planetary gear type step-variable transmission according to claim 7, wherein said second planetary gear set and said third planetary gear set constitute a planetary gear train of Ravigneaux type.

11. The vehicular planetary gear type step-variable transmission according to claim 7, wherein said third planetary gear set is of a double-pinion type.

12. The vehicular planetary gear type step-variable transmission according claim 7, wherein said second planetary gear set is a planetary gear set of a single-pinion type having a second sun gear, a second carrier and a second ring gear, said third planetary gear set is a planetary gear set of a double-pinion type having a third sun gear, a third carrier and a third ring gear, said second sun gear is selectively connected through said fourth clutch to said first intermediate output path, selectively connected through said third clutch to said second intermediate output path, and selectively fixed through said first brake to said stationary member, said second carrier and said third carrier are constituted by a common member, selectively connected through said second clutch to said first intermediate output path, and selectively fixed through said second brake to said stationary member, said second ring gear and said third ring gear are constituted by a common member and fixed to said output rotary member, and said third sun gear is selectively connected through said first clutch to said second intermediate output path.

13. The vehicular planetary gear type step-variable transmission according to claim 7, which has a plurality of gear positions selected from among:

a first gear position which is established by engaging said first clutch and said second brake or a one-way clutch and which has a highest speed ratio;

a second gear position which is established by engaging said first clutch and said first brake and which has a speed ratio lower than that of said first gear position;

a third gear position which is established by engaging said first clutch and said third clutch and which has a speed ratio lower than that of said second gear position;

a fourth gear position which is established by engaging said first clutch and said fourth clutch and which has a speed ratio lower than that of said third gear position;

a fifth gear position which is established by engaging said first clutch and said second clutch and which has a speed ratio lower than that of said fourth gear position;

a sixth gear position which is established by engaging said second clutch and said fourth clutch and which has a speed ratio lower than that of said fifth gear position;

a seventh gear position which is established by engaging said second clutch and said third clutch and which has a speed ratio lower than that of said sixth gear position; and an eighth gear position which is established by engaging said second clutch and said first brake and which has a speed ratio lower than that of said seventh gear position.

14. The vehicular planetary gear type step-variable transmission according to claim 7, further comprising an oil pump which is disposed on one side of said first planetary gear set that is remote from said second planetary gear set and which is rotated by said drive power source to supply a working fluid for engaging said clutches and said brakes, and wherein said fourth clutch is disposed in a space between said first planetary gear set and said oil pump.

15. The vehicular planetary gear type step-variable transmission according to claim 14, wherein said fourth clutch includes friction members, and a fourth clutch piston for forcing said friction members against each other to engage said fourth clutch, and wherein said fourth clutch piston is disposed on one side of the friction members of said fourth clutch which is on the side of said oil pump.

16. The vehicular planetary gear type step-variable transmission according to claim 7, wherein said fourth clutch includes friction members, and a fourth clutch piston for forcing said friction members against each other to engage said fourth clutch, and wherein said fourth clutch piston partially defines a centrifugal-pressure compensating oil chamber for said fourth clutch piston, said centrifugal-pressure compensating oil chamber being formed radially inwardly of the friction members of said fourth clutch.

17. The vehicular planetary gear type step-variable transmission according to claim 16, further comprising a return spring seat which cooperates with said fourth clutch piston to define therebetween said centrifugal-pressure compensating oil chamber.

18. The vehicular planetary gear type step-variable transmission according to claim 16, further comprising an oil pump cover having an oil passage through which a working oil is discharged from said centrifugal-pressure compensating oil chamber.

19. The vehicular planetary gear type step-variable transmission according to claim 7, wherein said third clutch has friction members disposed radially outwardly of said first ring gear, and a third clutch piston for forcing the friction members of said third clutch against each other to engage said third clutch, and said fourth clutch includes a fourth clutch cylinder disposed radially inwardly of a cylindrical portion of said third clutch piston, an oil seal being provided between said third clutch piston and said fourth clutch cylinder.

20. The vehicular planetary gear type step-variable transmission according to claim 19, wherein said third clutch further has a third clutch drum which cooperates with said third clutch piston to define therebetween an oil chamber for operating said third clutch piston.

* * * * *